US006577975B2

(12) United States Patent
Chiesa

(10) Patent No.: US 6,577,975 B2
(45) Date of Patent: Jun. 10, 2003

(54) DEVICE AND METHOD FOR AUTOMATIC CALIBRATION OF A MICROELECTROMECHANICAL STRUCTURE INCLUDED IN A CONTROL LOOP

(75) Inventor: Enrico Chiesa, Besozzo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/001,269

(22) Filed: Nov. 13, 2001

(65) Prior Publication Data

US 2002/0143484 A1 Oct. 3, 2002

(30) Foreign Application Priority Data

Nov. 16, 2000 (EP) .............................. 00830753

(51) Int. Cl.[7] .............................................. G01C 17/38
(52) U.S. Cl. .................. 702/94; 310/40 MM
(58) Field of Search .................. 702/87, 94; 73/514.18, 73/514.32; 310/40 MM; 318/560, 632

(56) References Cited

U.S. PATENT DOCUMENTS 6,035,694 A * 3/2000 Dupuie et al. ............... 73/1.38
6,301,965 B1 * 10/2001 Chu et al. .................. 73/514.18

OTHER PUBLICATIONS

Fedder, G.K. et al., "Multimode Digital Control of a Suspended Polysilicon Microstructure," *Journal of Microelectromechanical Systems*, 5(4):60, Dec. 1996.
"Micromachined Accelerometers," *Automotive Engineering*, No. 9, p. 60, Sep. 1991.

* cited by examiner

*Primary Examiner*—John Barlow
*Assistant Examiner*—Anthony T. Dougherty
(74) *Attorney, Agent, or Firm*—Lisa K. Jorgenson; E. Russell Tarleton; Seed IP Law Group

(57) ABSTRACT

A sensing device having a microelectromechanical structure made of semiconductor material, and a control loop for controlling the microelectromechanical structure, the microelectromechanical structure including a stator element and a rotor element electrostatically coupled together, and the control loop including a position interface supplying a position signal indicative of the position of the rotor element, and a one-bit quantizer receiving the position signal and supplying a corresponding bit sequence. The sensing device further includes a calibration device for calibrating the microelectromechanical structure, including a microactuator made of semiconductor material and coupled to the rotor element, and a driving circuit for driving the microactuator, and receiving the bit sequence and supplying to the microactuator a driving signal correlated to a mean value of the bit sequence in a given time window.

20 Claims, 4 Drawing Sheets

DEVICE AND METHOD FOR AUTOMATIC CALIBRATION OF A MICROELECTROMECHANICAL STRUCTURE INCLUDED IN A CONTROL LOOP

BACKGROUND OF THE INVENTION

1. Field of the Invention

The present invention regards a device and a method for automatic calibration of a microelectromechanical structure included in a control loop.

In particular, the present invention finds an advantageous, but not exclusive, application in the compensation of the position offset of an inertial sensor, to which the ensuing treatment will explicitly refer, without this entailing any loss of generality.

2. Description of the Related Art

As is known, owing to their reduced size, excellent technical characteristics, high reliability and low cost, integrated inertial sensors manufactured using the micromachining technique are progressively laying claim to market segments up to now occupied by conventional inertial sensors.

One of the main applications of the above inertial sensors is in the field of airbag systems for motor vehicles as a means for measuring the deceleration to which a motor vehicle is subjected upon impact.

An inertial sensor, also known as accelerometric sensor or accelerometer, is a particular transducer device capable of measuring and converting an acceleration into an electrical signal, and is basically formed by two distinct elements: a sensor proper and an electrical interface.

The sensor proper is the element that is able to carry out conversion between the quantity (acceleration), the value of which is to be determined, and a quantity that may be measured by means of circuitry of an electrical nature, whilst the second element of the transducer device is a capacitive reading interface, i.e., a charge integrator, capable of determining the capacitance variation due to the presence of an acceleration.

An integrated rotary inertial sensor, i.e., the only movement of which is of a rotational nature, is described in the European Patent No. 99830568.4 filed on Sep. 10, 1999, in the name of the present applicant and is shown in FIG. 1.

The inertial sensor, designated as a whole by 1, is made of semiconductor material, has a circular structure, and comprises an inner stator 2 integral with the die 3 in which the inertial sensor 1 is formed, and an outer rotor 4 electrostatically coupled to the stator 2.

The rotor 4 comprises a suspended mass 6 having an annular shape, a plurality of mobile arms 8 extending radially towards the stator 2 from the suspended mass 6, identical to each other and angularly equispaced, and elastic-suspension and anchorage elements 10 (represented schematically as springs) elastically connecting the suspended mass 6 to fixed anchoring and biasing regions 12, through which the suspended mass 6 and the mobile arms 8 are biased (typically at a potential of 1.5 V).

The stator 2 comprises a plurality of pairs of fixed arms 14, 16, one pair for each mobile arm 8 of the rotor 4, which extend radially with respect to the suspended mass 6 towards the suspended mass 6 itself, are arranged in such a way that between each pair of fixed arms 14, 16 a corresponding mobile arm 8 of the rotor 4 is arranged, and are connected to respective fixed anchoring and biasing regions 18, 20, through which the fixed arms 14, 16 are biased (typically at a potential ranging between 1.5 and 2.2 V).

The fixed arms 14, 16 are connected, via the fixed anchoring and biasing regions 18, 20, to a sensing circuit having the purpose of picking up, from the fixed arms 14, 16, information regarding the relative position of the rotor 4 with respect to the stator 2.

The inertial sensor 1 can be electrically modeled as shown in FIG. 2, i.e., by means of two capacitive elements 21, 22 having a half-bridge configuration, wherein the two outer plates are defined by the fixed arms 14 and 16, respectively, of the stator 2, and the two inner plates are defined by the mobile arms 8 of the rotor 4.

When the suspended mass 6 is subjected to an angular acceleration, it undergoes a rotation such as to determine a modulation in phase opposition of the capacitances, indicated in FIGS. 2 as $C_{S1}$ and $C_{S2}$, of the capacitive elements 21 and 22, respectively, which, in the absence of angular acceleration or deceleration applied to the inertial sensor 1, should assume the same value. Consequently, by measuring the capacitances $C_{S1}$ and $C_{S2}$ it is possible to measure the magnitude of the unknown inertial quantity, i.e., the acceleration or deceleration to which the inertial sensor 1 is subjected.

On account of the imperfect configuration of the elastic-suspension and anchoring elements 10 and on account of the residual mechanical stress of the material of which the inertial sensor 1 is made, the rotor 4 is generally affected by a position offset, i.e., the effective zero position of the rotor 4 does not coincide with the nominal zero position, centered with respect to the stator, envisaged in the design phase.

The position offset consequently gives rise to a corresponding capacitive offset, defined as the difference between the capacitances of the capacitive elements 21, 22 in the absence of acceleration or deceleration, which has an adverse effect on the overall performance of the system comprising the inertial sensor 1 and the corresponding driving and measuring circuitry.

To carry out compensation of the aforesaid capacitive offset, the inertial sensor 1 is provided with an integrated microactuator 24 made of semiconductor material, coupled to the rotor 4 and having the purpose of rotating the rotor 4 by an amount equal to the position offset to bring it back into the nominal zero position.

In particular, the microactuator 24 comprises four distinct actuator groups 26, each of which is arranged in a respective quadrant of the inertial sensor 1 and is formed by a plurality of actuator elements 28, numbering four in the example illustrated in FIG. 1, identical to one another and angularly equispaced.

In detail, each actuator element 28 is defined on the silicon wafer together with the suspended mass 6 of the rotor 4, and comprises a mobile arm 30 integral with the suspended mass 6 (and consequently biased at the same potential as that of the suspended mass 6), extending radially outwards from the suspended mass 6, and carrying a plurality of mobile electrodes 32 extending from either side of the respective mobile arm 30 in a substantially circumferential direction, arranged parallel to one another, and equispaced along the respective mobile arm 30.

Each actuator element 28 further comprises a pair of fixed arms 34, 36 which extend radially with respect to the suspended mass 6, arranged on opposite sides of the corresponding mobile arm 30 and facing the latter, and connected to respective fixed anchoring and biasing regions 38, 40, through which the fixed arms 34, 36 are biased (typically at a potential ranging between 1.5 and 5 V). Each of the fixed arms 34, 36 carries a plurality of fixed electrodes 42, 43 extending in a substantially circumferential direction towards the corresponding mobile arm 30 and interleaved, or "comb-fingered," with the mobile electrodes 32 of the corresponding mobile arm 30.

The fixed arms 34, 36 of the actuator elements 28 are connected, through the fixed anchoring and biasing regions 38, 40, to a driving circuit (not shown) having the purpose of applying a biasing voltage to either one or the other of the two fixed arms 34, 36 of each actuator element 28 in such a way that the potential difference between the fixed arm 34, 36 thus biased and the corresponding mobile arm 30 causes a rotation of the rotor 4 in one direction or the other, sufficient for bringing the rotor 4 back into the nominal zero position.

In particular, as a result of the electrostatic coupling existing between each mobile arm 30 and the corresponding fixed arms 34, 36, the rotor 4 is subjected to a transverse force proportional to the number of pairs of fixed arms and mobile arms 30, 34, 36. This force tends to move the mobile arm 30 away from the fixed arm 34, 36, with respect to which the mobile arm 30 has a smaller potential difference, and to bring the mobile arm 30 closer to the fixed arm 34, 36, with respect to which the mobile arm 30 has a greater potential difference, thus causing rotation of the suspended mass 6.

Owing to the presence of the comb-fingered electrodes 32, 42, 43, the force necessary to bring the rotor 4 back from the effective zero position to the nominal zero position is altogether independent of the amount of offset with respect to the nominal zero position itself.

As regards implementation of the electrical interface of the inertial sensor 1, there essentially exist two different solutions.

The first solution consists in reading and amplifying the capacitance variation of the capacitive half-bridge of FIG. 2 caused by the angular acceleration to which the inertial sensor 1 is subjected. This technique represents a direct approach to the problem, whereby at output from the electrical interface there is a voltage directly proportional to the capacitance variation.

An alternative solution is proposed in "A Three-Axis Micromachined Accelerometer with a CMOS Position-Sense Interface and Digital Offset-Trim Electronics," Mark Lemkin, Member IEEE, and Bernhard E. Boser, Member IEEE, IEE Journal of Solid-state Circuits, Vol. 34, No. 4, April 1999.

This solution basically consists in inserting the inertial sensor in a fedback system consisting of a control loop that measures the displacement of the rotor 4 with respect to its nominal position and accordingly applies to the rotor 4 a torque such as to maintain the rotor 4 in the nominal position. The value of the unknown inertial quantity (angular acceleration) is then proportional to the feedback torque necessary for nullifying the displacement of the rotor generated by the external load.

FIG. 3 illustrates the block diagram of the sensing device proposed in the above-mentioned publication.

The sensing device, designated as a whole by 50, comprises an inertial sensor 52 not provided with any actuator elements for compensation of the position offset, and a control loop 53 having the purpose of maintaining the rotor 4 in its nominal position and of measuring the acceleration to which the inertial sensor 52 is subjected.

From the control standpoint, the sensing device 50 has a circuit structure similar to that of a sigma-delta converter widely used in analog-to-digital conversion, wherein the inertial sensor 52 is inserted instead of the integrator (constituting the sigma part of the AD converter) and performs the conversion of the angular acceleration to which it is subjected into a variation in the capacitances $C_{S1}$ and $C_{S2}$ of the capacitive elements 21, 22.

The control loop 53 operates in a time division mode in the two sensing and actuation steps; namely, it switches between an actuation operating condition in which, through the fixed anchoring and biasing regions 18, 20 of the fixed arms 14, 16, it drives the rotor 4 to keep it in its nominal position, and a sensing operating condition in which, through the same fixed anchoring and biasing regions 18, 20, it measures the angular acceleration to which the inertial sensor 52 is subjected.

In particular, the control loop 53 comprises an adder 54 receiving at input an input acceleration $\zeta_{IN}$, the value of which is to be measured, and a feedback acceleration $\zeta_{RET}$ supplied by a feedback branch which will be described hereinafter, and supplies at output an error acceleration $\zeta_{ERR}$ equal to the difference between the input acceleration $\zeta_{IN}$ and the feedback acceleration $\zeta_{RET}$.

The error acceleration $\zeta_{ERR}$ is supplied at input to the inertial sensor 52, which supplies at output a capacitance variation $\Delta C_S$ indicative of the variation in the capacitances $C_{S1}$ and $C_{S2}$ of the capacitive elements 21, 22 of FIG. 2 caused by the error acceleration $\zeta_{ERR}$, the capacitance variation $\Delta C_S$ being calculated according to the following relation:

$$\Delta C_S = \varepsilon_0 \cdot \frac{S}{gap}$$

where S is the area of the plates of the capacitive elements 21, 22, and gap is the variation in distance between the fixed arms 14, 16 of the stator 2 and the corresponding mobile arms 8 of the rotor 4 caused by the error acceleration $\zeta_{ERR}$.

The control loop 53 further comprises a differential position interface 56 receiving at input the capacitance variation $\Delta C_S$ supplied by the inertial sensor 52 and supplying at output a voltage position signal $V_{OUT}$ indicative of the position of the rotor 4 and is calculated according to the following relation:

$$V_{OUT} = \frac{\Delta C_S}{C_I} \cdot V_M$$

wherein $C_I$ and $V_M$ assume the meanings described hereinafter.

In particular, the position interface 56 is implemented using the differential circuit diagram shown in FIG. 4, i.e., using an operational amplifier 58 in fully differential configuration, the inverting and non-inverting input terminals of which are connected, through the capacitive elements 21, 22 in half-bridge configuration, to a voltage generator 60 supplying a square wave measurement voltage $V_M$, and the inverting and non-inverting output terminals of which are respectively connected to the inverting and non-inverting input terminals via respective feedback capacitive elements 62, 64 having capacitance $C_I$.

With reference again to FIG. 3, the control loop 53 further comprises a one-bit quantizer 66 receiving at input the position signal $V_{OUT}$ supplied by the position interface 56 and supplying at output a digital signal OUT assuming a first logic value, for instance 1, if the position signal $V_{OUT}$ is positive, and a second logic value, in the example considered 0, if the position signal $V_{OUT}$ is negative.

The digital signal OUT supplied by the one-bit quantizer 66 defines a sequence of bits generally referred to as "bitstream," a term that will be used also in the ensuing treatment.

Finally, the control loop 53 comprises a main feedback branch 67 having the function of driving the rotor 4 to maintain it in its nominal position, and essentially formed by a main actuator 68 receiving at input the bitstream OUT supplied by the one-bit quantizer 66 and supplying at output the aforementioned feedback acceleration $\zeta_{RET}$, which is indicative of the acceleration (and hence the torque) applied to the rotor 4 to maintain it in its nominal position, and the absolute value and sign of which define the intensity and direction of the feedback necessary for maintaining the rotor 4 in its nominal position.

In particular, the main actuator 68 acts directly on the biasing of the fixed arms 14, 16 of the stator 2, and consequently on the mobile arms 8 of the rotor 4, to maintain the rotor 4 in its nominal position, and is implemented using the differential circuit diagram shown in FIG. 5, in which the capacitive elements 21, 22 defined by the fixed and mobile arms 8, 14, 16 are shown.

In detail, the main actuator 68 basically comprises two pairs of switches, designated by 70, 72 and 74, 76, controlled by the bitstream OUT supplied by the one-bit quantizer 66.

The switches 70, 72 of the first pair are respectively controlled by the bitstream OUT and by the negated bitstream $\overline{OUT}$ (obtained by means of a simple NOT logic gate—not shown) and connect selectively, and in phase opposition, the fixed arms 14 of the stator 2 to a supply line 78 set at a supply voltage $V_{RET}$ and to a ground line 80 set at a ground voltage $V_{GND}$, whilst the switches 74, 76 of the second pair are also respectively controlled by the negated bitstream $\overline{OUT}$ and by the bitstream OUT, and connect selectively, and in phase opposition, the fixed arms 16 of the stator 2 to the supply line 78 and to the ground line 80.

The biasing voltage actually applied to the fixed arms 14, 16 of the stator 2 thus comes to be a voltage correlated to the bitstream OUT, namely, a pulse modulated voltage modulated by the bitstream OUT (PDM—Pulse Density Modulation), and consequently also the feedback acceleration $\zeta_{RET}$ applied to the rotor 4 to keep it in its nominal position is correlated to the bitstream OUT.

The closed loop control of the position of the rotor of the inertial sensor 52 and, consequently, the measurement of the angular acceleration to which the inertial sensor 52 is subjected performed by the circuit structure of FIG. 3, are, however, adversely affected both by the position offset existing between the rotor 4 and the stator 2 and by the voltage offsets present in the active electronic devices, such as operational amplifiers and comparators, and by the mismatches of the passive electronic components, such as resistors and capacitors, that are present in the control loop 53.

In particular, owing to the factors referred to above, in the absence of angular acceleration applied to the inertial sensor 52, the bitstream OUT supplied by the one-bit quantizer 66 has a non-zero mean value, whereby, in this operating condition, the value of the feedback acceleration $\zeta_{RET}$ generated by the main actuator 68 is non-zero and thus causes, at best, a reduction in the intervention dynamics of the control loop 53, whilst, at worst, it may even lead to complete saturation of the control loop 53.

In fact, the control loop 53 is typically able to recover capacitance variations $\Delta C_S$ of the order of the fF, whereas the capacitance variations $\Delta C_S$ generated by the offsets and mismatches referred to above may reach values that are even decidedly higher. Consequently, in the presence of sufficiently small offsets and mismatches, the dynamics of the control loop 53 is reduced by the part necessary for recovering the said offsets and mismatches, whereas, in the presence of high offsets and mismatches, the control loop 53 is completely saturated, and its dynamics is consequently reduced to zero.

It has moreover been experimentally verified by the present applicant that the above-mentioned offsets and mismatches rarely assume sufficiently small values, such as to lead to a negligible, or in any case not too significant, reduction in the dynamics of the control loop 53; on the contrary, they often assume values such as to bring the control loop 53 to complete saturation. Consequently, the recovery of the aforementioned offsets and mismatches is increasingly becoming an indispensable requirement in this type of applications.

BRIEF SUMMARY OF THE INVENTION

The disclosed embodiments of the present invention provide a sensing device and an automatic calibration method thereof that will enable the drawbacks described above to be overcome at least in part.

According to one embodiment of the invention, a sensing device is provided that includes a microelectromechanical structure made of semiconductor material, a control loop for controlling the microelectromechanical structure, the microelectromechanical structure including a stator element and a rotor element electrostatically coupled together, and the control loop including an interface circuit coupled to the microelectromechanical structure and supplying a position signal indicative of the position of the rotor element; and a calibration circuit for calibrating the structure, the calibration circuit including at least one actuator made of semiconductor material and coupled to the rotary element, the first driving circuit for driving the at least one actuator including a first driving circuit receiving a position signal and supplying to the at least one actuator a driving signal correlated to a mean value of the position signal.

In accordance with another embodiment of the invention, a method for automatic calibration of a sensing device is provided, the sensing device including a microelectromechanical structure made of semiconductor material and a control loop for controlling the same, a microelectromechanical structure including a stator element and a rotor element electrostatically coupled together, the control loop including an interface circuit coupled to the microelectromechanical structure and configured to supply a position signal indicative of the position of the rotor element. The method includes the step of repositioning the rotor element to overcome voltage offset and component mismatches, which further includes the steps of providing an actuator made of semiconductor material and coupled to the rotor element; and supplying to the actuator a driving signal correlated to a mean value of the position signal.

In accordance with another aspect of the foregoing method of the present invention, the control loop includes a quantizer for receiving the position signal and supplying a corresponding sequence of samples, and the step of driving the actuator includes the step of supplying to the actuator a driving signal correlated to a mean value of the sequence of samples.

BRIEF DESCRIPTION OF THE SEVERAL VIEWS OF THE DRAWING(S)

For a better understanding of the present invention, two preferred embodiments thereof are now described, purely to furnish non-limiting examples, with reference to the attached drawings, in which.

DETAILED DESCRIPTION OF THE INVENTION

Figure 3:
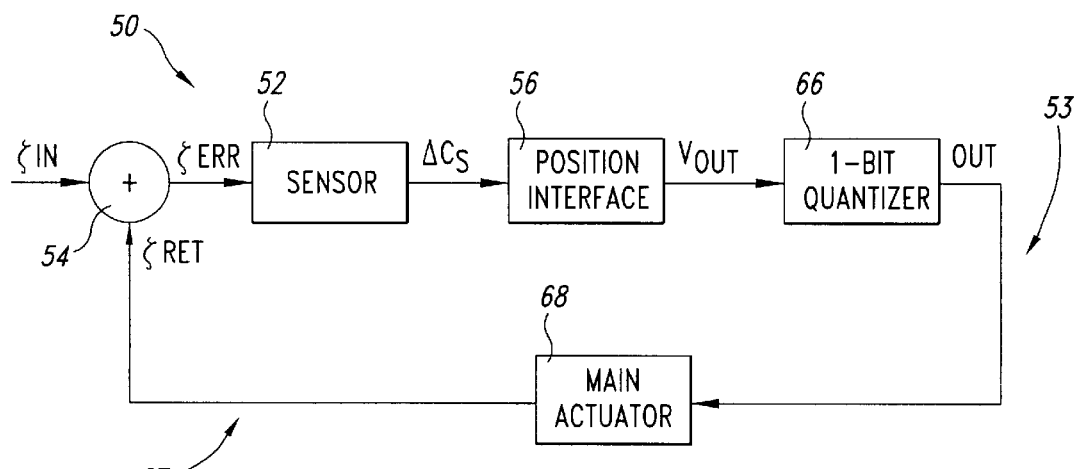
FIG. 3 shows the block diagram of a prior art sensing device, formed by an inertial sensor and a control loop for controlling the inertial sensor.
Figure 4:
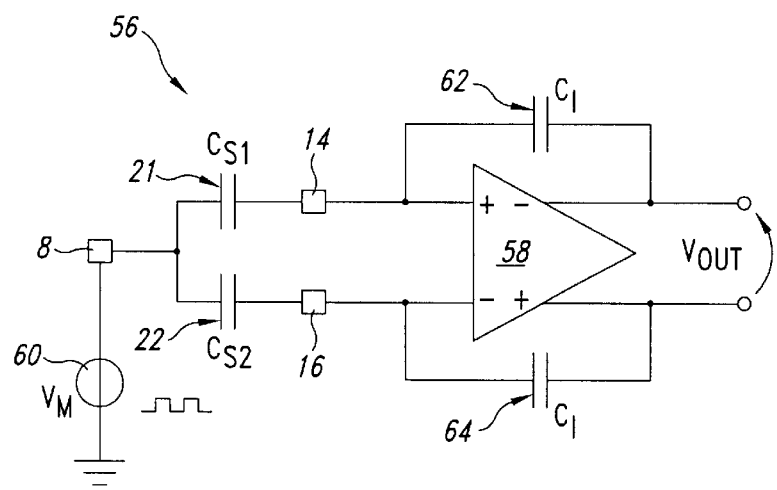
FIG. 4 shows the circuit structure of a position interface forming part of the control loop of FIG. 3.
Figure 5:
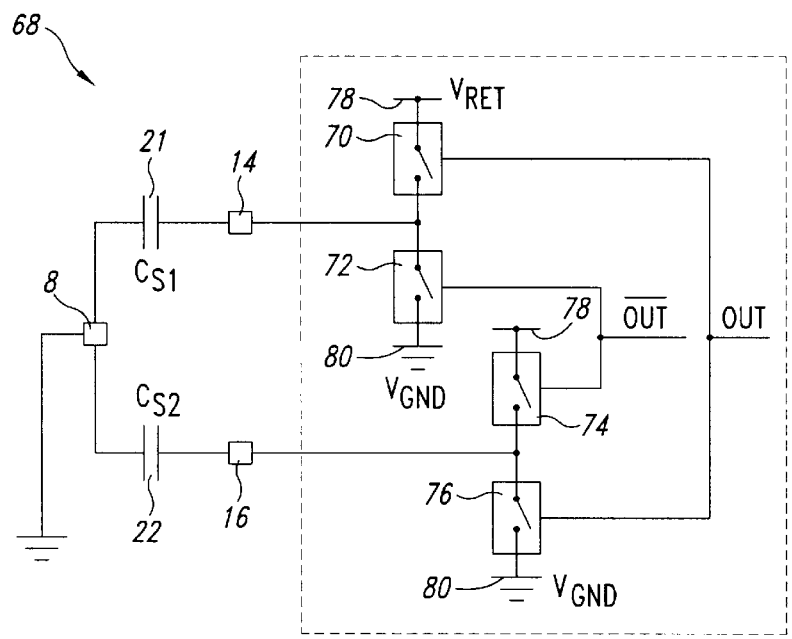
FIG. 5 shows the circuit structure of a main actuator forming part of the control loop of FIG. 3.

The present invention stems from the realization that, in the sensing device of FIG. 3, the position offset of the inertial sensor, the voltage offset present in the active electronic devices used in the control loop, and the mismatches of the passive electronic components also used in the control loop are "seen" by the control loop as virtual accelerations applied to the inertial sensor.

Consequently, by using an inertial sensor of the type shown in FIG. 1, namely, one provided with actuator elements for compensating the position offset, and by appropriately modifying the control loop in the way described in detail hereinafter, it is possible to obtain that the control loop will handle these virtual accelerations in the same way as it handles the accelerations actually applied to the inertial sensor 1, consequently nullifying the effects of the above-mentioned offsets and mismatches.

In other words, by appropriately intervening on the control loop, it is possible to obtain that, just as the control loop acts to nullify the effects on the position of the rotor of the accelerations actually applied on the inertial sensor, it will likewise act to nullify the effects, again on the position of the rotor, of the aforesaid virtual accelerations (i.e., of the aforesaid offsets and mismatches), thus achieving an effective automatic calibration procedure for calibrating the inertial sensor, because there is in fact a substantial nullification of all the negative effects produced by the above-mentioned offsets and mismatches on the control of the position of the rotor and on the measurement of the angular acceleration to which the inertial sensor is subjected.

In greater detail, according to the present invention a sensing device is provided that comprises an inertial sensor 1 equipped with actuator elements for compensating the position offset, and a control loop formed by a main feedback branch identical to that of FIG. 3 and of a secondary feedback branch having the purpose of estimating, on the basis of the bitstream OUT supplied by the one-bit quantizer 66, the extent of the offsets and mismatches present in the inertial sensor and in the active and passive devices used in the control loop, and of acting accordingly on the biasing of the fixed arms 34, 36 of the actuator elements 28 in such a way as to nullify the effects of said offsets and mismatches on the position of the rotor 4.

Figure 6:
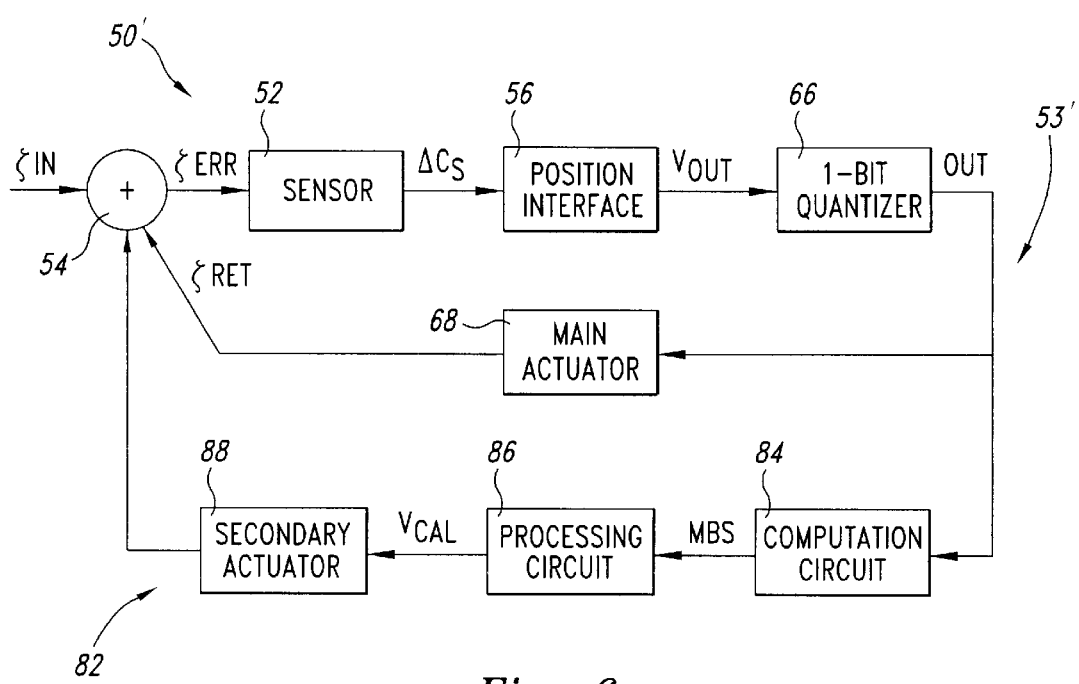
FIG. 6 shows the block diagram of a sensing device according to one embodiment of the present invention, formed by the inertial sensor of FIG. 1 and a control loop for controlling this inertial sensor.

FIG. 6 shows the block diagram of a sensing device according to the present invention, wherein the parts that are identical to those of FIG. 3 are designated by the same reference numbers.

Figure 1:
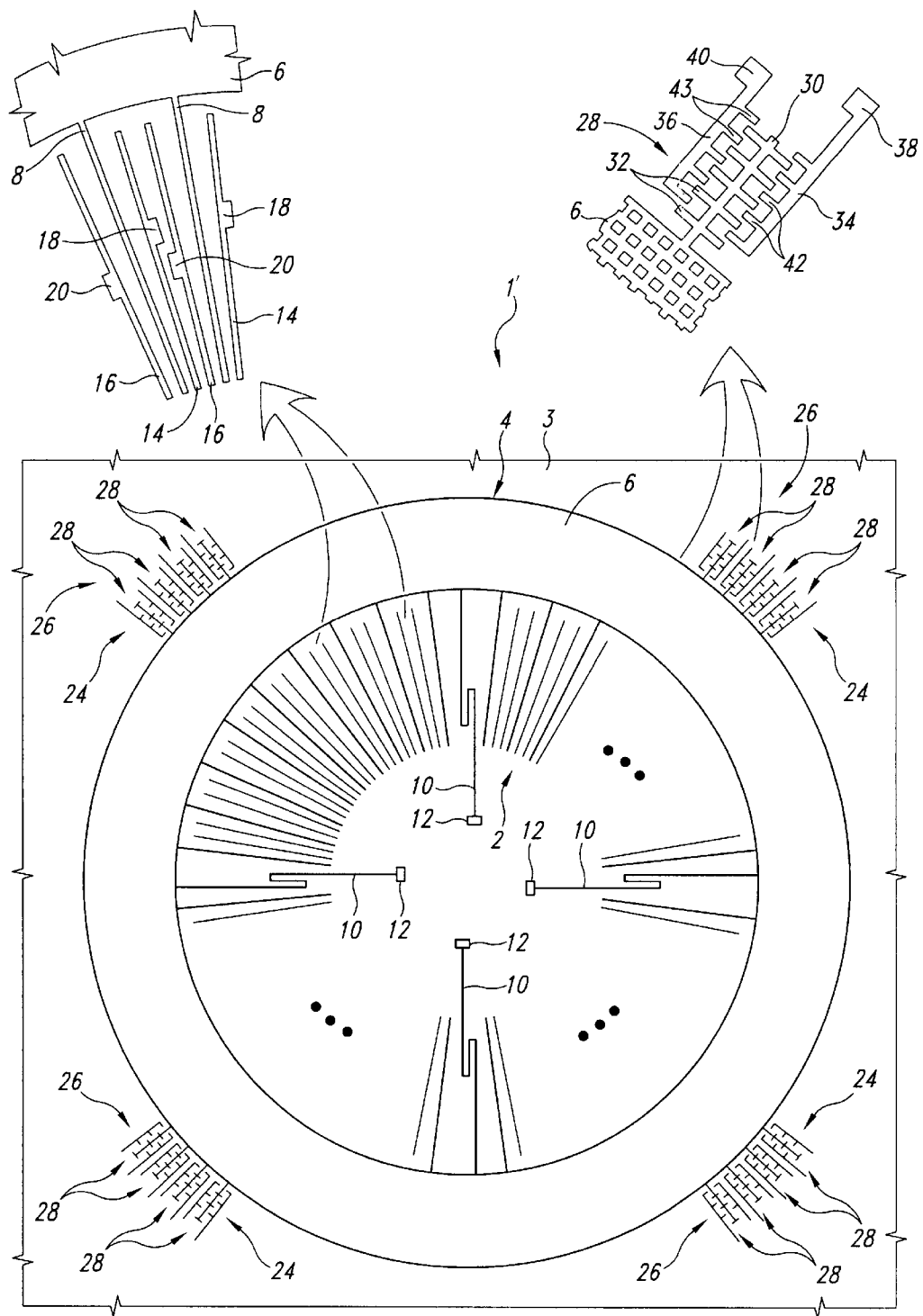
FIG. 1 is a schematic representation of the structure of a rotary inertial sensor.
Figure 2:
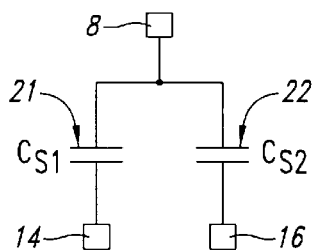
FIG. 2 shows an equivalent electrical circuit of the inertial sensor of FIG. 1.

The sensing device, designated as a whole by 50', has a circuit structure similar to that of the sensing device 50 and comprises an inertial sensor 52 of the type shown in FIG. 1, hence represented by an inertial sensor designated by 1, and a corresponding control loop, designated by 53'.

The control loop 53' comprises, as does the control loop 53, an adder 54, a position interface 56, a one-bit quantizer 66, and a main feedback branch 67 formed by a main actuator 68, all of which, consequently, will not be described again.

According to one feature of the present invention, the control loop 53' further comprises a secondary feedback branch 81 arranged in parallel to the main feedback branch 67 and mainly consisting of a calibration device 82.

The calibration device 82 comprises a computation circuit 84 receiving at input the bitstream OUT supplied by the one-bit quantizer 66 and supplying at output a dimensionless number MBS equal to the mean value of the bitstream OUT within a pre-set time window.

In particular, the computation circuit 84 sums together the logic values of a number N of bits supplied by the one-bit quantizer 66, for example $N=2^{15}$, and divides the said sum by the number N itself; namely, it implements the following formula:

$$MBS = \frac{1}{N} \cdot \sum_{i=1}^{K} bit(i)$$

where bit(i) may assume only the values +1 and −1.

In fact, with reference to the meanings assumed by the individual bits of the bitstream OUT, it may be understood how a bit having logic value 1 involves application, to the rotor 4, of a torque in a given direction, whilst the arrival of a bit having logic value 0 involves application to the rotor 4 of a torque (angular acceleration) in the opposite direction. In the above formula, therefore, any bit of the bitstream OUT having logic value 0 is mathematically considered as having logic value −1.

In practice, the computation circuit 84 may be implemented by means of a moving average filter of length N.

It is moreover emphasized that the mean value MBS of the bitstream OUT supplied at output by the computation circuit 84 represents an estimate of the offsets and mismatches present in the inertial sensor 52 and in the active and passive devices used in the control loop 53. In fact, a mean value MBS of the bitstream OUT equal to zero indicates the absence of offsets and mismatches, whilst a mean value MBS of the bitstream OUT equal to +1 or to −1 indicates the presence of offsets and mismatches of such amounts as to saturate the control loop 53 completely.

The calibration device 82 further comprises a processing circuit 86 receiving at input the mean value MBS of the bitstream OUT supplied by the computation circuit 84 (one at each sampling instant) and supplying at output a calibration voltage $V_{CAL}$, which is applied to the fixed arms 34, 36 of the actuator elements 28 to bring about the application to the rotor 4 of a torque sufficient for compensating the above-mentioned offsets and mismatches.

In particular, the actuator elements 28 are represented in FIG. 6 by means of a secondary actuator 88 receiving at input the calibration voltage $V_{CAL}$ and supplying at output a calibration acceleration $\zeta_{CAL}$ which, when applied to the rotor 4, brings about compensation of the aforementioned offsets and mismatches.

In particular, the calibration acceleration $\zeta_{CAL}$ is supplied at input to the adder 54, which supplies at output an error acceleration $\zeta_{ERR}$ equal to the algebraic sum of the input acceleration $\zeta_{IN}$, the feedback acceleration $\zeta_{RET}$, and the calibration acceleration $\zeta_{CAL}$.

The calibration voltage $V_{CAL}$ is determined by the processing circuit 86, not only according to the mean value MBS of the bitstream OUT, but also according to the mechanical characteristics (moment of inertia) of the inertial sensor 1, in so far as the said calibration voltage $V_{CAL}$ must be such as to apply to the rotor 4 a torque sufficient for compensating the offsets and mismatches, and consequently cannot fail to take into account the mechanical characteristics of the inertial sensor 1.

According to a further feature of the present invention, calibration of the inertial sensor 1 is performed by the calibration device 82 executing a two-step calibration procedure, which is described hereinafter with reference to the flowchart of FIG. 7, wherein in the first step of said procedure, a rough calibration is performed which enables recovery of large capacitance variations $\Delta C_S$ generated by the above-mentioned offsets and mismatches, whilst in the second step a finer calibration is performed that enables recovery of small capacitance variations $\Delta C_S$, and hence refinement of the calibration of the inertial sensor 1.

Figure 7:
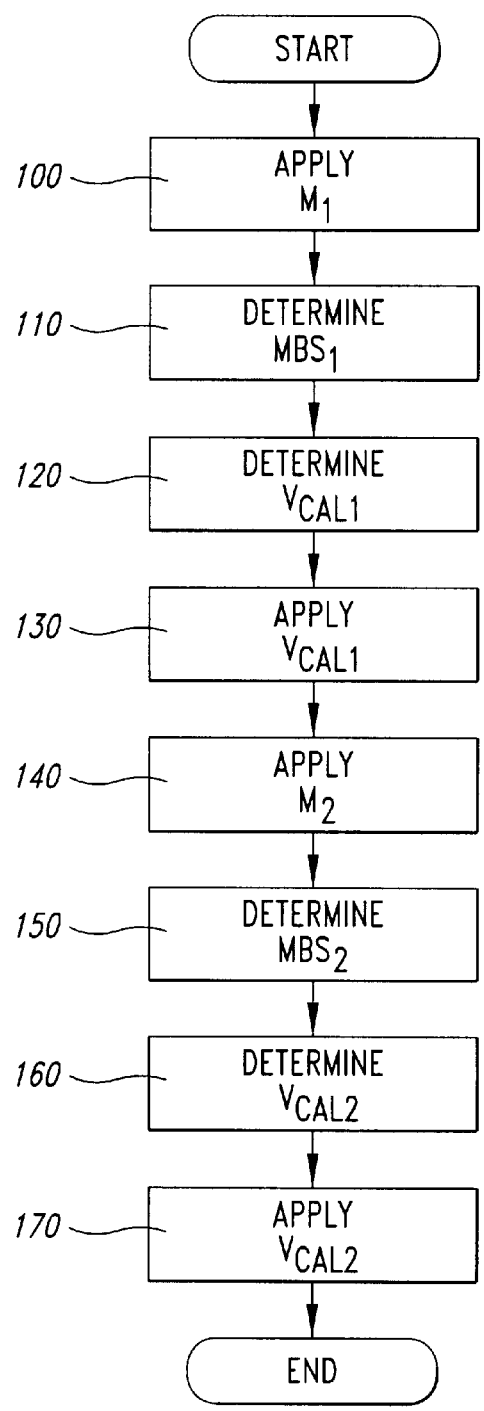
FIG. 7 shows a flowchart relative to the method for calibration of the sensing device of FIG. 6 in accordance with another embodiment of the invention.

In particular, as illustrated in FIG. 7, in the first step of the calibration procedure, the main actuator 68 drives the inertial sensor 1 in such a way as to apply to the rotor 4 a torque $M_1$ greater than the torque that is applied thereto during normal operation of the inertial sensor 1, and in particular the said torque $M_1$ is generated by biasing the supply line 78 of the main actuator 68 at a supply voltage $V_{RET1}$ greater than the one used during normal operation of the inertial sensor 1 (block 100).

Experimental tests carried out by the present applicant have shown that, given the values generally assumed by the above-mentioned offsets and mismatches, a torque $M_1$ approximately eight times greater than that applied during normal operation of the inertial sensor 1 (and hence, given the quadratic link between torque and voltage, a supply voltage $V_{RET1}$ approximately $\sqrt{8}$ times higher than the one used during normal operation of the inertial sensor 1) is sufficient for recovering a fair proportion of the capacitance variations $\Delta C_S$ generated in the aforesaid offsets and mismatches.

At this point, the computation circuit 84 determines the mean value $MBS_1$ of the bitstream OUT resulting from the application to the rotor 4 of the torque $M_1$ (block 110), and the mean value $MBS_1$ is supplied to the processing circuit 86, which stores it and accordingly calculates a corresponding calibration voltage $V_{CAL1}$ in the way described in detail hereinafter (block 120).

The calibration voltage $V_{CAL1}$ is then applied to the actuator elements 28, and the consequent rotational movement of the rotor 4 performs a compensation of a fair proportion of the offsets and mismatches that are present (block 130).

The remainder of the offsets and mismatches are compensated in the second step of the calibration procedure, in which the main actuator 68 drives the inertial sensor 1 in such a way as to apply to the rotor 4 a torque $M_2$ equal to the torque applied thereto during normal operation of the inertial sensor 1, and in particular the said torque $M_2$ is generated by biasing the supply line 78 of the main actuator 68 at a supply voltage $V_{RET2}$ equal to the one used during normal operation of the inertial sensor 1 (block 140).

The computation circuit 84 then determines the mean value $MBS_2$ of the bitstream OUT resulting from the application to the rotor 4 of the torque $M_2$ (block 150), and the mean value $MBS_2$, which by now assumes a value close to zero, is supplied to the processing circuit 86, which stores it and accordingly calculates a corresponding calibration voltage $V_{CAL2}$ in the way described hereinafter (block 160).

The said calibration voltage $V_{CAL2}$ is then applied to the actuator elements 28, and the consequent rotational movement of the rotor 4 performs complete compensation of the offsets and mismatches that are present (block 170).

According to a further feature of the present invention, the two calibration voltages $V_{CAL1}$ and $V_{CAL2}$ applied to the actuator elements 28 in the first and second steps of the calibration procedure and described with reference to blocks 120, 160 are generated by pulse width modulating (PWM—Pulse Width Modulation) the same maximum calibration voltage $V_{MAX}$, which is a square wave voltage having an amplitude variable between a zero value and a maximum value corresponding to the maximum torque that it is intended to apply to the rotor 5, and a duty-cycle that can be modulated according to the mean values $MBS_1$ and $MBS_2$ of the bitstream OUT that are calculated in the blocks 110 and 150.

In particular, the calibration voltage $V_{CAL1}$ applied to the actuator elements 28 at the end of the first step of the calibration procedure is generated by pulse width modulating the maximum calibration voltage $V_{MAX}$ in proportion to the mean value $MBS_1$, whilst, since the calibration voltage $V_{CAL2}$ applied to the actuator elements 28 at the end of the second step of the calibration procedure is a refinement of the calibration voltage $V_{CAL1}$, it is generated by pulse width modulating the maximum calibration voltage $V_{MAX}$ in proportion to a mean value $MBS_3 = MBS_1 + \alpha MBS_2$, where $\alpha$ is the ratio between the torques $M_1$ and $M_2$ applied to the rotor 4 respectively in the second step and in the first step of the calibration procedure (in the example considered, $\alpha = \frac{1}{8}$).

In this way, the calibration torque $M_{CAL}$ applied to the rotor 4 by the actuator elements 28 is simply proportional to the ratio between the time interval $T_{ON}$ in which the maximum calibration voltage $V_{MAX}$ assumes a high logic value and the time interval $T_{OFF}$ in which the maximum calibration voltage $V_{MAX}$ assumes a low logic value; namely:

$$M_{CAL} = \frac{T_{ON}}{T_{ON} + T_{OFF}} \cdot M_{MAX} = T_{ON} \cdot f \cdot M_{MAX}$$

where $f = 1(T_{ON} + T_{OFF})$ is the frequency of the maximum calibration voltage $V_{MAX}$, and $M_{MAX}$ is the maximum torque corresponding to the maximum calibration voltage $V_{MAX}$.

Once the frequency of the maximum calibration voltage $V_{MAX}$ has been fixed, by simply acting on the duration $T_{ON}$ it is possible to apply the aforementioned different torques in the two steps of the calibration procedure.

As regards the practical implementation of the pulse width modulation of the maximum calibration voltage $V_{MAX}$, this may be simply done by using a B-bit counter receiving a clock signal CK having a period $T_{CK}$. In fact, if the torque applied to the rotor 4 is kept at the maximum value for the first n clock pulses, we have $T_{ON}=n \cdot T_{CK}$, and $T_{ON}+T_{OFF}=1/f=2^B \cdot T_{CK}$, and hence:

$$M_{CAL} = \frac{n}{2^B} \cdot M_{MAX}.$$

Consequently, we have $0<M_{CAL}<M_{MAX}$, with a resolution equal to $\Delta M_{CAL}=M_{MAX}/2^B$.

From an examination of the characteristics of the sensing device according to the present invention, the advantages that the said sensing device affords emerge evidently.

In particular, with the present invention it is possible to perform automatic calibration of the inertial sensor 1 by means of simple operations, the practical implementation of which involves the use of equally simple electronic circuits, in this way eliminating all the problems of reduction in the dynamics or of saturation of the control loop that afflict the sensing devices according to the prior art.

Finally, it is clear that modifications and variations may be made to the inertial sensor described and illustrated herein, without thereby departing from the sphere of protection of the present invention.

For example, the quantizer present in the control loop might not be a one-bit quantizer, but an n-bit quantizer supplying at output a sequence of samples, each of n bits.

In addition, the calibration procedure described above could be performed using, in both steps, the same supply voltage $V_{RET}$ that is used during normal operation of the inertial sensor 1. This would inevitably involve an increase in the number of steps necessary for reaching a mean value MBS of the bitstream OUT equal to zero, and hence for reaching the calibration voltage $V_{CAL}$ that enables complete nullification of the offsets and mismatches; however, this would in no way jeopardize the final result, namely the final value of the calibration voltage $V_{CAL}$, but it would simply affect the number of steps required for achieving the said result.

Furthermore, should, in certain particular applications, at the end of the second step of the calibration procedure the mean value $MBS_2$ of the bitstream OUT fail to be exactly zero, which would be an indication of a not yet perfect calibration, it is always possible to perform further steps similar to the previous ones.

In this case, the multi-step calibration procedure for calibrating the inertial sensor 1 could be performed using, in the various steps, supply voltages $V_{RET}$ that are different from one another, for example ones that are progressively decreasing until they reach the value of the supply voltage used during normal operation of the inertial sensor 1, or else could be performed, as regards the first two steps, in a way similar to that described previously (namely, using in the first step a supply voltage higher than the one used during normal operation, and in the second step a supply voltage equal to the one used during normal operation), and using, instead, in the steps after the second, always a supply voltage $V_{RET}$ equal to the one used during normal operation.

In addition, the number of actuator groups 26 and the number of actuator elements 28 in each actuator group 26 of the inertial sensor 1 could be different from what has been described. In particular, even a single actuator element 28 connected to the suspended mass 6 could be provided, or else four actuator elements 28, each arranged in a respective quadrant, or else two actuator elements 28 arranged on diametrically opposite sides of the suspended mass 6, or again two actuator groups 26 arranged on diametrically opposite sides of the suspended mass 6.

Furthermore, the inertial sensor 1 could be of a linear type, in which the microactuator 24 is driven in such a way as to impress on the rotor 4 a translational movement with respect to the stator in a rectilinear direction, the fixed and mobile arms of the rotor and of the stator extend from the suspended mass orthogonally to the said direction, and the fixed and mobile electrodes extend from the said arms parallel to the said direction.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. A sensing device comprising a microelectromechanical structure made of semiconductor material, and a control loop for controlling said microelectromechanical structure, said microelectromechanical structure comprising: a stator element and a rotor element electrostatically coupled together, and said control loop comprising interface means coupled to said microelectromechanical structure and supplying a position signal indicative of the position of said rotor element; and calibration means for calibrating said microelectromechanical structure, said calibration means including actuator means made of semiconductor material and coupled to said rotor element, and first driving means, for driving said actuator means, said first driving means receiving said position signal and supplying to said actuator means a driving signal correlated to a mean value of said position signal.

2. The sensing device of claim 1 wherein said control loop further comprises quantizer means receiving said position signal and supplying a corresponding sequence of samples; said first driving means receiving said sequence of samples and supplying said driving signal correlated to a mean value of said sequence of samples.

3. The sensing device of claim 2 wherein said quantizer means are one-bit quantizer means.

4. The sensing device of claim 2 wherein said mean value is a moving average of said sequence of samples in a given time window.

5. The sensing device of claim 1 wherein said control loop further comprises second driving means for driving said microelectromechanical structure; said second driving means comprising first signal generating means generating in succession a first driving signal such as to bring about the application, on said rotor element, of a first torque greater than a normal torque used during normal operation of said microelectromechanical structure, and a second driving signal to bring about the application, on said rotor element, of a second torque comparable to the normal torque of said microelectromechanical structure; and wherein said first driving means comprise second signal generating means generating in succession a first driving signal for said actuator means as a function of a first mean value of the position signal resulting from the application, on said rotor element, of said first torque, and a second driving signal for said actuator means as a function of said first mean value and of a second mean value of the position signal resulting from the application, on said rotor element, of said second torque.

6. The sensing device of claim 5 wherein said second signal generating means generate said second driving signal as a function of said first and second mean values and of the ratio between said first torque and said second torque.

7. The sensing device of claim 5 wherein said second signal generating means comprise pulse width modulation means receiving a reference driving signal and said first and second mean values, and supplying said first and second driving signals, said first driving signal obtained by pulse width modulating said reference driving signal as a function of said first mean value, and said second driving signal obtained by pulse width modulating said reference driving signal as a function of said first and second mean values.

8. The sensing device of claim 5, further comprising biasing means supplying to said second driving means a first biasing voltage higher than the normal torque used during normal operation of said microelectromechanical structure so as to bring about the application, on said rotor element, of said first torque, and a second biasing voltage comparable to the normal torque used during normal operation of said microelectromechanical structure so as to bring about the application, on said rotor element, of said second torque.

9. A calibration method for calibrating a sensor device having a microelectromechanical structure made of semiconductor material, and a control loop for controlling said microelectromechanical structure, said microelectromechanical structure including a stator element and a rotor element electrostatically coupled together, and said control loop including interface means coupled to said microelectromechanical structure and supplying a position signal indicative of the position of said rotor element, said calibration method comprising the step of moving said rotor element, wherein said step of moving said rotor element comprises the steps of:
providing actuator means made of semiconductor material and coupled to said rotor element; and
supplying, to said actuator means, a driving signal correlated to a mean value of said position signal.

10. The calibration method of claim 9, for a control loop further including quantizer means receiving said position signal and supplying a corresponding sequence of samples, wherein said step of driving said actuator means comprises the step of:
supplying, to said actuator means, a driving signal correlated to a mean value of said sequence of samples.

11. The calibration method of claim 9 wherein said quantizer means perform a one-bit quantization of said position signal.

12. The calibration method of claim 9 wherein said mean value is a moving average of said sequence of samples in a given time window.

13. The calibration method of claim 9 wherein said step of moving said rotor element comprises the steps of:
driving said microelectromechanical structure by means of said control loop in such a way as to apply to said rotor element a first torque higher than a normal torque used during normal operation of said microelectromechanical structure;
supplying to said actuator means a first driving signal correlated to a first mean value of the position signal resulting from the application of said first torque;
then driving said microelectromechanical structure by means of said control loop in such a way as to apply to said rotor element a second torque comparable to the normal torque; and
supplying, to said actuator means, a second driving signal correlated to said first mean value and to a second mean value of the position signal resulting from the application of said second torque.

14. The calibration method of claim 13 wherein said step of supplying said second driving signal to said actuator means comprises the step of generating said second driving signal as a function of said first and second mean values and of the ratio between said first torque and said second torque.

15. The calibration method of claim 13 wherein said steps of supplying to said driving means a first and a second driving signal comprises the steps of:
generating said first driving signal by pulse width modulating a third driving signal as a function of said first mean value; and
generating said second driving signal by pulse width modulating said third driving signal as a function of said first and second mean values.

16. The calibration method of claim 13 for a control loop having second driving means for driving said microelectromechanical structure, wherein said step of driving said microelectromechanical structure by means of said control loop in such a way that a first torque is applied to said rotor element comprises the step of supplying to said second driving means a first biasing voltage higher than a normal biasing voltage used during normal operation of said microelectromechanical structure, and said step of driving said microelectromechanical structure by means of said control loop in such a way that a second torque is applied to said rotor element comprises the step of supplying to said driving means a second biasing voltage comparable to the normal biasing voltage used during normal operation of said microelectromechanical structure.

17. A sensing device, comprising:
an inertial sensor comprising a stator element and a rotor element electrostatically coupled together;
a position interface circuit coupled to the inertial sensor and configured to generate a position signal indicative of the position of the rotor element;
a quantizer coupled to the position interface and configured to receive the position signal and to generate a sequence of samples;
a main actuator coupled to the output of the quantizer for receiving the sequence of samples and configured to modify a position of the rotor element;
an adder having an output coupled to the inertial sensor and a first input coupled to the actuator;
a computation circuit having an input coupled to the output of the quantizer and configured to generate a mean value of the sequence of samples;
a processing circuit having an input coupled to the computation circuit and configured to receive the mean value of the sequence of samples and to generate a driving signal; and
a secondary actuator having an input coupled to the processing circuit and an output coupled to the adder, the secondary actuator configured to generate a calibration acceleration signal to be applied to the rotor to compensate for voltage offsets and component mismatches.

18. A sensing device, comprising:
an inertial sensor comprising a stator element and a rotor element electrostatically coupled together;
a main feedback branch coupled to the inertial sensor and including a main actuator configured to generate a primary feedback signal for changing the position of the rotor element relative to the stator element; and
a secondary feedback branch coupled to the main feedback branch and to the inertial sensor, the secondary feedback branch comprising a computation circuit configured to receive a sequence of sample signals from the main feedback branch and to generate a mean value signal corresponding to the mean value of the sequence of samples, a processing circuit having an input coupled to the computation circuit and configured to generate a driving signal in response to the mean value signal, and a secondary actuator having an input coupled to the processing circuit and configured to receive the driving signal and to generate a secondary feedback signal that is received by an adder coupled to the input of the inertial sensor.

19. A method of calibrating an inertial sensor having a stator element and a rotor element electrostatically coupled together and controlled through a main feedback branch having a quantizer generating a sequence of samples to a main actuator that generates a first feedback signal, the method comprising:

receiving the sequence of samples in a secondary feedback branch coupled and parallel to the main feedback branch and generating a secondary feedback signal that is added to the primary feedback signal from the main actuator.

20. A method of calibrating an inertial sensor having a stator element and a rotor element electrostatically coupled together and controlled by a main feedback branch having a quantizer that generates a sequence of samples to a main actuator that in turn generates a first feedback signal to the inertial sensor, the calibration method comprising:

receiving the sequence of samples at a computation circuit and generating therefrom a mean value signal;

receiving the mean value signal at a processing circuit and generating therefrom a voltage calibration signal;

receiving the voltage calibration signal at a secondary actuator and generating therefrom a secondary feedback signal; and adding the secondary feedback signal to the primary feedback signal and combining the same with an input signal and outputting the sum thereof to the inertial sensor.

* * * * *